US012684561B2

(12) United States Patent (10) Patent No.: US 12,684,561 B2
Bagheri et al. (45) Date of Patent: Jul. 14, 2026

(54) APPARATUS AND METHOD OF CANCELLING A PUSCH TRANSMISSION

(71) Applicant: Lenovo (Singapore) PTE. LTD, New Tech Park (SG)

(72) Inventors: Hossein Bagheri, Urbana, IL (US); Vijay Nangia, Woodridge, IL (US); Hyejung Jung, Northbrook, IL (US)

(73) Assignee: Lenovo (Singapore) PTE. LTD, New Tech Park (SG)

( * ) Notice: Subject to any disclaimer, the term of this patent is extended or adjusted under 35 U.S.C. 154(b) by 792 days.

(21) Appl. No.: 17/924,351

(22) PCT Filed: May 12, 2021

(86) PCT No.: PCT/US2021/031882
§ 371 (c)(1),
(2) Date: Nov. 9, 2022

(87) PCT Pub. No.: WO2021/231507
PCT Pub. Date: Nov. 18, 2021

(65) Prior Publication Data
US 2023/0189255 A1 Jun. 15, 2023

Related U.S. Application Data

(60) Provisional application No. 63/024,477, filed on May 13, 2020.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/23* (2023.01); *H04W 72/566* (2023.01)

(58) Field of Classification Search
CPC .......... H04W 72/1268; H04W 72/566; H04W 72/23; H04L 1/1812; H04L 1/08;
(Continued)

(56) References Cited

U.S. PATENT DOCUMENTS

2020/0068496 A1* 2/2020 Yang ................... H04W 52/262
2020/0305183 A1* 9/2020 Papasakellariou .... H04W 52/54
(Continued)

FOREIGN PATENT DOCUMENTS

WO WO-2020032695 A1 * 2/2020 ........... H04L 1/1854

OTHER PUBLICATIONS

21730357, "Communication Pursuant to Article 94(3) EPC", EP Application No. 21730357, Apr. 24, 2024, 5 pages.
(Continued)

*Primary Examiner* — Ian N Moore
*Assistant Examiner* — Latresa A McCallum
(74) *Attorney, Agent, or Firm* — FIG. 1 Patents

(57) ABSTRACT

A configured grant configuration including resources for uplink data transmissions can be received (310). A PUSCH transmission corresponding to the configured grant configuration can be prepared (320). A transport block of the PUSCH transmission can correspond to a HARQ process and can be prepared to be repeated a number of times in a first set of resources configured for the PUSCH transmission. A first DCI indicating an ACK for the HARQ process corresponding to the transport block can be received (330). A second DCI indicating a second set of resources can be received (340). The first set of resources and the second set of resources overlap in the time domain. A cancellation time associated with the PUSCH transmission can be determined (350) based on both the received first DCI and the received second DCI. The PUSCH transmission can be cancelled (360) according to the cancellation time.

20 Claims, 4 Drawing Sheets

(51) Int. Cl.
    *H04W 72/23*      (2023.01)
    *H04W 72/566*    (2023.01)

(58) Field of Classification Search
    CPC ... H04L 1/1671; H04L 1/1864; H04L 1/1887;
                            H04L 1/189; H04L 1/1822
    See application file for complete search history.

(56)               References Cited

U.S. PATENT DOCUMENTS

2022/0046666 A1 *   2/2022   Takeda .............. H04W 72/1268
2025/0159689 A1 *   5/2025   Liu ......................... H04L 5/003

OTHER PUBLICATIONS

Moderator (OPPO), "Summary#1 on UCI enhancements for R16 URLLC", 3GPP TSG RAN WG1 #100b-e, R1-2002695, e-Meeting, Apr. 2020, 65 pages.
PCT/US21/31882, "International Search Report and Written Opinion", PCT Application No. PCT/US21/31882, Dec. 8, 2021, 9 pages.

* cited by examiner

200

Min Process=Tproc2+d

Min Process=N2

Case 1

DFI

DCI
(HP)

Rep W

HP
UL

Case 2

DCI
(HP)

DFI

Rep W

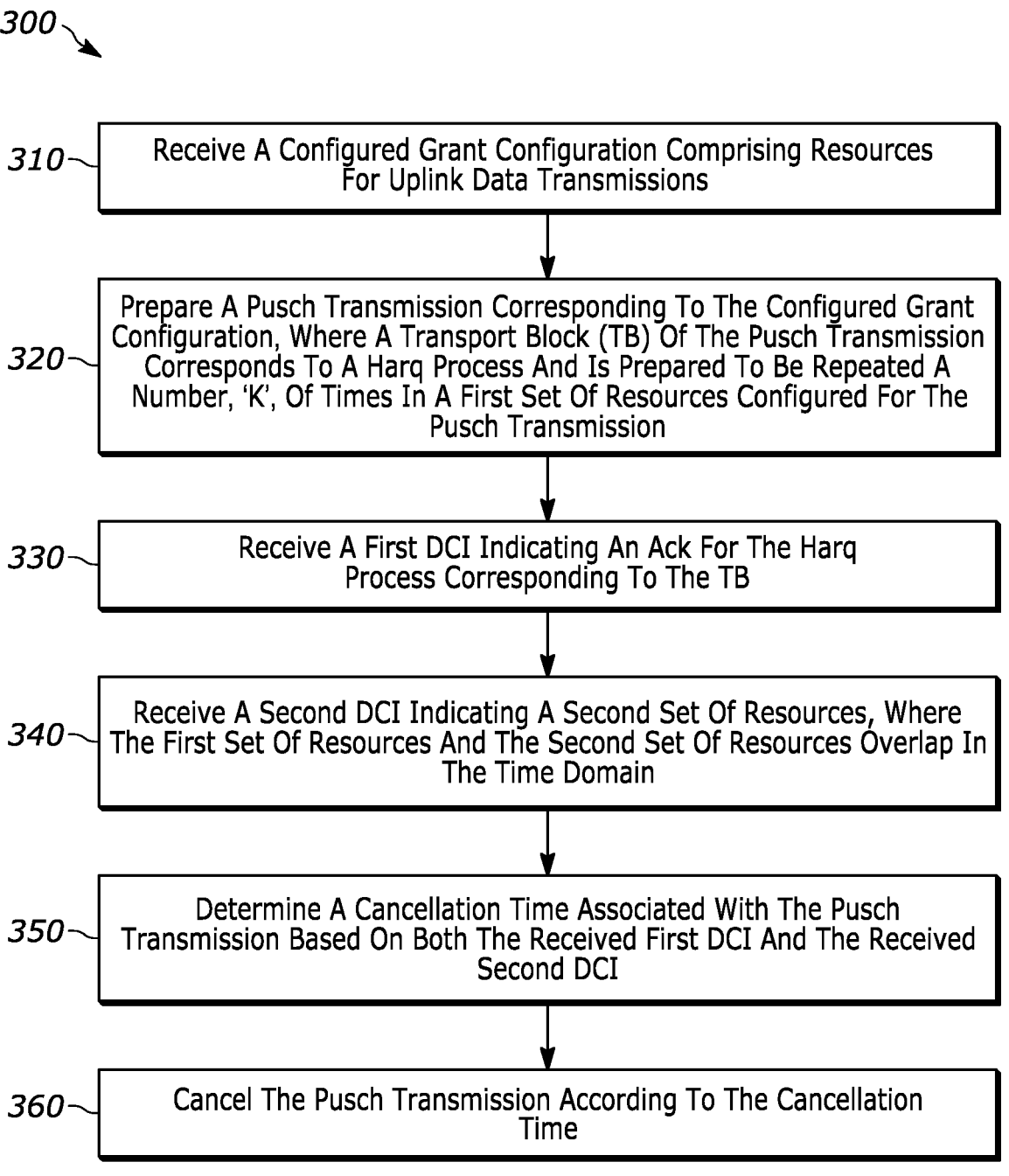

300

310 — Receive A Configured Grant Configuration Comprising Resources For Uplink Data Transmissions 320 — Prepare A Pusch Transmission Corresponding To The Configured Grant Configuration, Where A Transport Block (TB) Of The Pusch Transmission Corresponds To A Harq Process And Is Prepared To Be Repeated A Number, 'K', Of Times In A First Set Of Resources Configured For The Pusch Transmission 330 — Receive A First DCI Indicating An Ack For The Harq Process Corresponding To The TB 340 — Receive A Second DCI Indicating A Second Set Of Resources, Where The First Set Of Resources And The Second Set Of Resources Overlap In The Time Domain 350 — Determine A Cancellation Time Associated With The Pusch Transmission Based On Both The Received First DCI And The Received Second DCI 360 — Cancel The Pusch Transmission According To The Cancellation Time

FIG. 3

APPARATUS AND METHOD OF CANCELLING A PUSCH TRANSMISSION

BACKGROUND

1. Field

The present disclosure is directed to an apparatus and method of cancelling a PUSCH transmission.

2. Introduction

Presently, wireless communication devices, such as UEs, communicate with other communication devices using wireless signals. A UE with PUSCH transmission corresponding to a configured grant including multiple repetitions of a transport block can be indicated a DFI via a PDCCH. If the DFI indicates an ACK for the transport block, the UE shall terminate the repetitions of the transport block not sooner than a number, N2, of symbols from the end of the PDCCH.

If the PUSCH transmission is associated with low priority, in case the UE has a high-priority UL transmission overlapping with the low-priority UL transmission in a slot, the UE is expected to cancel the low-priority UL transmission starting from $T_{proc,2}+d1$ after the end of PDCCH scheduling the high-priority transmission. The minimum processing time of the high priority channel transmission is extended by d2 symbols; where d1 and d2 are determined based on UE capability signaling.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 2 is an example illustration of two received cancellation indications for low priority CG UL transmission according to possible embodiments;

FIG. 3 is an example flowchart illustrating the operation of an apparatus according to a possible embodiment.

DETAILED DESCRIPTION

Embodiments provide an apparatus and method for communicating on a wireless network. At least some embodiments can provide an apparatus and method for cancelling a PUSCH transmission. According to a possible embodiment, a configured grant configuration including resources for uplink data transmissions can be received. A PUSCH transmission corresponding to the configured grant configuration can be prepared. A transport block of the PUSCH transmission can correspond to a HARQ process and can be prepared to be repeated a number of times in a first set of resources configured for the PUSCH transmission. A first DCI indicating an ACK for the HARQ process corresponding to the transport block can be received. A second DCI indicating a second set of resources can be received. The first set of resources and the second set of resources overlap in the time domain. A cancellation time associated with the PUSCH transmission can be determined based on both the received first DCI and the received second DCI. The PUSCH transmission can be cancelled according to the cancellation time.

Figure 1:
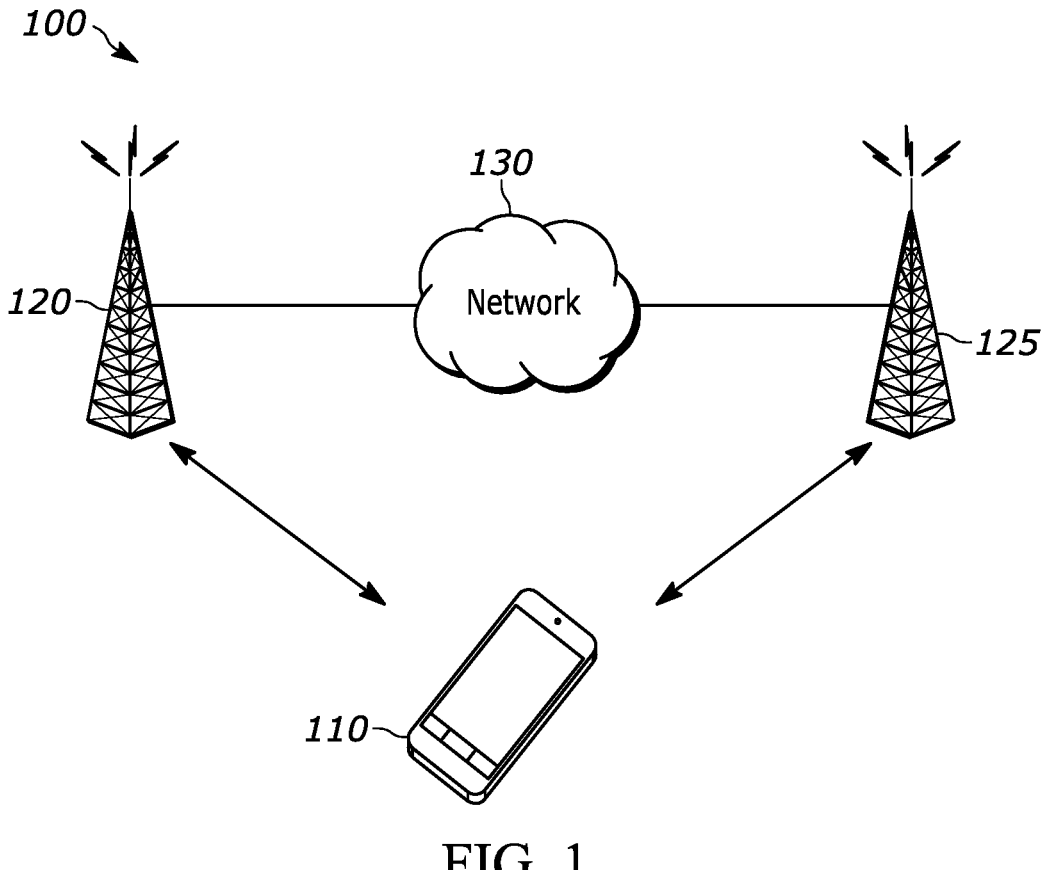
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an IoT device, or any other user device that is capable of sending and receiving communication signals on a wireless network. The at least one network entity 120 and 125 can be a wireless wide area network base station, can be a NodeB, can be an eNB, can be a gNB, such as a 5G NodeB, can be an unlicensed network base station, can be an access point, can be a base station controller, can be a network controller, can be a TRP, can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a TDMA-based network, a CDMA-based network, an OFDMA-based network, an LTE network, a NR network, a 3GPP-based network, a 5G network, a satellite communications network, a high-altitude platform network, the Internet, and/or other communications networks.

In operation, the UE 110 can communicate with the network 130 via at least one network entity 120. For example, the UE 110 can send and receive control signals on a control channel and user data signals on a data channel.

Noting that the termination/cancellation time/requirement of the low-priority UL transmission due to DFI reception ('N2' symbols) is different than the termination/cancellation time/requirement of the low-priority UL transmission due to receiving an UL grant scheduling a high-priority UL transmission ('$T_{proc,2}+d1$'), embodiments can provide mechanisms to handle the situation where the UE has received a DFI indicating an ACK for the low-priority configured grant UL transmission with multiple repetitions; and has received a PDCCH scheduling a high-priority UL transmission overlapping with at least one repetition of the low-priority configured grant UL transmission.

For downlink feedback indication, according to TS 38.214, if a UE receives an ACK for a given HARQ process in CG-DFI in a PDCCH ending in symbol i to terminate a transport block repetition in a PUSCH transmission with a configured grant on a given serving cell with the same HARQ process after symbol i, the UE is expected to terminate the repetition of the transport block in a PUSCH transmission starting from a symbol j if the gap between the end of PDCCH of symbol i and the start of the PUSCH transmission in symbol j is equal to or more than N2 symbols. The value N2 in symbols is determined according to the UE processing capability defined in Clause 6.4 of 38.214, and N2 and the symbol duration are based on the minimum of the subcarrier spacing corresponding to the PUSCH and the subcarrier spacing of the PDCCH indicating CG-DFI.

According to 38.213, a UE can be configured a number of search space sets to monitor PDCCH for detecting a DCI format 0_1 with a DFI flag field and CRC scrambled with a CS-RNTI provided by cs-RNTI. The UE determines that the DCI format provides HARQ-ACK information for PUSCH transmissions when a DFI flag field value is set to '1', if a PUSCH transmission is configured by ConfiguredGrant-Config.

The HARQ-ACK information corresponds to transport blocks in PUSCH transmissions for all HARQ processes for a serving cell of a PDCCH reception that provides DCI format 0_1 or, if DCI format 0_1 includes a carrier indicator field, for a serving cell indicated by a value of the carrier indicator field.

For a PUSCH transmission configured by Config-uredGrantConfig, HARQ-ACK information for a transport block of a corresponding HARQ process number is valid if a first symbol of the PDCCH reception is after a last symbol of the PUSCH transmission, or of any repetition of the PUSCH transmission, by a number of symbols provided by cg-minDFIDelay-r16.

For a PUSCH transmission scheduled by a DCI format, HARQ-ACK information for a transport block of a corresponding HARQ process number is valid if a first symbol of the PDCCH reception is after a last symbol of the PUSCH transmission by a number of symbols provided by cg-minDFIDelay-r16 or, if the PUSCH transmission is over multiple slots, after a last symbol of the PUSCH transmission in a first slot from the multiple slots by a number of symbols provided by cg-minDFIDelay-r16, if a value of the HARQ-ACK information is ACK, or after a last symbol of the PUSCH transmission in a last slot from the multiple slots by a number of symbols provided by cg-minDFIDelay-r16, if a value of the HARQ-ACK information is NACK.

From 38.331, cg-minDFIDelay indicates the minimum duration (in unit of symbols) from the ending symbol of the CG-PUSCH to the starting symbol of the DFI carrying HARQ-ACK for that PUSCH. UE assumes HARQ-ACK is valid only for PUSCH transmissions ending before n-cg-DFIDelay-r16, where n is the time corresponding to the beginning of the start symbol of the DFI (see TS 38.213 [13], clause 10.3).

For intra-UE multiplexing and priority of UL transmis-sion (TS 38.213), a PUSCH or a PUCCH transmission, including repetitions if any, can be of priority index 0 or of priority index 1. For a configured grant PUSCH transmis-sion, a UE determines a priority index from higher layer parameter priority, if provided. For a PUCCH transmission with HARQ-ACK information corresponding to a SPS PDSCH reception or a SPS PDSCH release, a UE deter-mines a priority index from higher layer parameter harq-CodebookID, if provided. If a priority index is not provided to a UE for a PUSCH or a PUCCH transmission, the priority index is 0.

If a UE is provided pdsch-HARQ-ACK-Codebook-List, the UE can be indicated by pdsch-HARQ-ACK-Codebook-List to generate one or two HARQ-ACK codebooks. If the UE is indicated to generate one HARQ-ACK codebook, the HARQ-ACK codebook is associated with a PUCCH of priority index 0. If the UE is indicated to generate two HARQ-ACK codebooks. A first HARQ-ACK codebook is associated with a PUCCH of priority index 0 and a second HARQ-ACK codebook is associated with a PUCCH of priority index 1. The UE is provided first and second for each of {PUCCH-Config, UCI-OnPUSCH, PDSCH-code-BlockGroupTransmission} by {PUCCHConfigurationList, UCI-OnPUSCH-List, PDSCH-CodeBlockGroupTransmis-sion-List}, respectively, for use with the first and second HARQ-ACK codebooks, respectively.

If a UE receives a PDSCH without receiving a corre-sponding PDCCH, or if the UE receives a PDCCH indicat-ing a SPS PDSCH release, the UE generates one corre-sponding HARQ-ACK information bit. If the UE generates two HARQ-ACK codebooks, the UE is indicated by harq-CodebookID, per SPS PDSCH configuration, a HARQ-ACK codebook index for multiplexing the corresponding HARQ-ACK information bit.

A UE can be configured by SchedulingRequestRe-sourceConfig a set of configurations for SR in a PUCCH transmission using either PUCCH format 0 or PUCCH format 1. A UE can be configured by schedulingRequest-IDForBFR a configuration for LRR in a PUCCH transmis-sion using either PUCCH format 0 or PUCCH format 1. The UE can be provided, by phy-PriorityIndex-r16 in Schedul-ingRequestResourceConfig, a priority index 0 or a priority index 1 for the SR. If the UE is not provided a priority index for SR, the priority index is 0.

For collision handling of UL transmissions with different priorities, in RAN1 #99, the following was agreed: When a high-priority UL transmission overlaps with a low-priority UL transmission in a slot, the UE is expected to cancel the low-priority UL transmission starting from $T_{proc,2}$+d1 after the end of PDCCH scheduling the high-priority transmis-sion, where $T_{proc,2}$ is corresponding to UE processing time capability for the carrier; value d1 is the time duration corresponding to 0,1,2 symbols reported by UE capability (d_2,1=0 is for cancellation); the minimum processing time of the high priority channel is extended by d2 symbols; and value d2 is the time duration corresponding to 0,1,2 symbols reported by UE capability. The overlapping condition is per repetition of the uplink transmission. When a high-priority UL transmission overlaps with a low-priority UL transmis-sion in a slot, the UE is not expected to be scheduled to transmit in the non-overlapping canceled symbols According to 38.214, if a UE reports the capability of intra-UE prioritization, and if a PUSCH corresponding to a configured grant and a PUSCH scheduled by a PDCCH on a serving cell are partially or fully overlapping in time, if the PUSCH corresponding to the configured grant has priority in configuredGrantConfig set to 1 (i.e., high priority), and the PUSCH scheduled by the PDCCH is indicated as low priority by having the priority indicator field in the sched-uling DCI set to 0 or by not having the priority indicator field present in the scheduling DCI, the UE is expected to transmit the PUSCH corresponding to the configured grant, and cancel the PUSCH transmission scheduled by the PDCCH at latest starting at the first symbol of the PUSCH corresponding to the configured grant. Otherwise, the UE shall cancel the PUSCH transmission corresponding to the configured grant at latest starting M symbols after the end of the last symbol of the PDCCH carrying the DCI scheduling the PUSCH, and transmit the PUSCH scheduled by the PDCCH, where $M=T_{proc,2}+d_1$, where $T_{proc,2}$ is given by clause 6.4 for the corresponding PUSCH timing capability assuming $d_{2,1}=0$ and $d_1$ is determined by the reported UE capability. In this case, the UE is not expected to be scheduled for the PUSCH by the PDCCH where the PUSCH starts earlier than N symbols after the end of the last symbol of the PDCCH, where $N=T_{proc,2}+d_2$, where $T_{proc,2}$ is the PUSCH preparation time of the PUSCH scheduled by the PDCCH using the associated PUSCH timing capability according to clause 6.4 and $d_2$ is determined by the reported UE capability. In case of PUSCH repetitions, the overlap-ping handling is performed for each PUSCH repetition separately. The UE is not expected to be scheduled for another PUSCH by a PDCCH where this PUSCH starts no earlier than the end of the prioritized transmitted PUSCH and before the end of the time domain allocation of the cancelled PUSCH.

For cancellation indication, according to 38.213, if a UE is provided UplinkCancellation, the UE is provided, in one or more serving cells, a search space set for monitoring the first PDCCH candidate with a CCE aggregation level of $L_{CI}$ CCEs of the search space set for detection of a DCI format 2_4 [TS 38.212] with a CI-RNTI provided by ci-RNTI as described in Subclause 10.1. UplinkCancellation additionally provides to the UE a set of serving cells, by ci-ConfigurationPerServingCell, that includes a set of serving cell indexes and a corresponding set of locations for fields in DCI format 2_4 by positionInDCI, a number of fields in DCI format 2_4, by positionInDCI-forSUL, for each serving cell for a SUL carrier, if the serving cell is configured with a SUL carrier, an information payload size for DCI format 2_4 by dci-PayloadSize-forCI, and an indication for time-frequency resources by timeFrequencyRegion.

For a serving cell having an associated field in a DCI format 2_4, for the field denote by $N_{CI}$ a number of bits provided by CI-PayloadSize; $B_{CI}$ a number of PRBs provided by frequencyRegionforCI in timeFrequencyRegion; $T_{CI}$ a number of symbols, excluding symbols for reception of SS/PBCH blocks and DL symbols indicated by tdd-UL-DL-ConfigurationCommon, from a number of symbols that is provided by timeDurationforCI in timeFrequencyRegion, if the PDCCH monitoring periodicity for the search space set with the DCI format 2_4 is one slot and there are more than one PDCCH monitoring occasions in a slot, or is equal to the PDCCH monitoring periodicity, otherwise; and $G_{CI}$ a number of partitions for the $T_{CI}$ symbols provided by time-GranularityforCI in timeFrequencyRegion.

$G_{CI}$ sets of bits from the MSB of the $N_{CI}$ bits have a one-to-one mapping with $G_{CI}$ groups of symbols where each of the first $G_{CI}-T_{CI}+\lfloor T_{CI}/G_{CI}\rfloor \cdot G_{CI}$ groups includes $\lfloor T_{CI}/G_{CI}\rfloor$ symbols and each of the remaining $T_{CI}-\lfloor T_{CI}/G_{CI}\rfloor \cdot G_{CI}$ groups includes $\lceil T_{CI}/G_{CI}\rceil$ symbols. A UE determines a symbol duration with respect to a SCS configuration of an active DL BWP where the UE monitors PDCCH for DCI format 2_4 detection.

For a group of symbols, $N_{BI}=N_{CI}/G_{CI}$ bits from each set of bits have a one-to-one mapping with $N_{BI}$ groups of PRBs where each of the first $N_{BI}-B_{CI}+\lfloor B_{CI}/N_{BI}\rfloor \cdot N_{BI}$ groups includes $\lfloor B_{CI}/N_{BI}\rfloor$ PRBs and each of the remaining $B_{CI}-\lfloor B_{CI}/N_{BI}\rfloor \cdot N_{BI}$ groups includes $\lceil B_{CI}/N_{BI}\rceil$ PRBs. A UE determines a first PRB index as $$N_{RFR}^{start} = O_{carrier} + RB_{start}$$

and a number of contiguous RBs as $B_{CI}=L_{RB}$ from frequencyRegionforCI that indicates an offset $RB_{start}$ and a length $L_{RB}$ as RIV according to [6, TS 38.214], and from offset-ToCarrier in FrequencyInfoUL-SIB that indicates $O_{carrier}$ for a SCS configuration of an active DL BWP where the UE monitors PDCCH for DCI format 2_4 detection.

An indication by a DCI format 2_4 for a serving cell is applicable to a PUSCH transmission or an SRS transmission on the serving cell. For the serving cell, the UE determines the first symbol of the $T_{CI}$ symbols to be the first symbol that is after $T'_{proc,2}$ from the end of a PDCCH reception where the UE detects the DCI format 2_4, where $T_{proc,2}$ is obtained from $T_{proc,2}$ for PUSCH processing capability 2 [6, TS 38.214] assuming $d_{2,1}=$delta_offset$\cdot 2^{-\mu_{UL}}/2^{-\mu}$, $\mu$ being the smallest SCS configuration between the SCS configuration of the PDCCH and the smallest SCS configuration $\mu_{UL}$ provided in scs-SpecificCarrierList of FrequencyInfoUL or FrequencyInfoUL-SIB. The UE does not expect to cancel the PUSCH transmission or the SRS transmission before a corresponding symbol that is $T_{proc,2}$ after a last symbol of a CORESET where the UE detects the DCI format 2_4.

A UE that detects a DCI format 2_4 for a serving cell cancels a PUSCH transmission or a repetition of a PUSCH transmission [TS 38.214] if the PUSCH transmission is with repetitions, as determined in Clauses 9 and 9.2.5, or an SRS transmission on the serving cell if, respectively, the transmission is PUSCH with priority 0, if the UE is provided applicabilityforCI, a group of symbols, from the $T_{CI}$ symbols, has at least one bit value of '1' in the corresponding set of $N_{BI}$ bits in the DCI format 2_4 and includes a symbol of the (repetition of the) PUSCH transmission or of the SRS transmission, and a group of PRBs, from the $B_{CI}$ PRBs, has a corresponding bit value of '1' in the set of bits corresponding to the group of symbols in the DCI format 2_4 and includes a PRB of the (repetition of the) PUSCH transmission or of the SRS transmission; where the cancellation of the (repetition of the) PUSCH transmission includes all symbols from the earliest symbol of the (repetition of the) PUSCH transmission that is in a group of symbols having corresponding bit values of '1' in the DCI format 2_4; and the cancellation of the SRS transmission includes only symbols that are in one or more groups of symbols having corresponding bit values of '1' in the DCI format 2_4.

A UE derives the RUR start based on "logical time" (i.e., assuming DL timing difference is 0 and TA=0) and the actual cancellation symbol based on "actual time" (i.e. assuming actual DL timing difference, actual TA). A new RRC parameter delta_offset d having possible values {0, 1, 2} OFDM symbols is introduced, update the spec as the following: For the serving cell, the UE determines the first symbol of the $T_{CI}$ symbols to be the first symbol that is after $T_{proc,2}$+d from the end of a PDCCH reception where the UE detects the DCI format 2_4. $T_{proc,2}$ corresponds to the PUSCH processing capability 2 [6, TS 38.214] assuming d2,1=0 with $\mu$ being the smallest SCS configuration between the SCS configurations of the PDCCH and of a PUSCH transmission or of an SRS transmission on the serving cell. UE may not be expected to cancel the transmission of SRS or PUSCH before the first symbol that is $T_{proc,2}$ after the end of the reception of the last symbol of the PDCCH carrying the ULCI including the effect of the timing advance.

An indication by a DCI format 2_4 for a serving cell can be applicable to PUSCH or SRS transmissions on the serving cell. For the serving cell, the UE can determine the first symbol of the $T_{CI}$ symbols to be the first symbol that is after $T_{proc,2}$+d from the end of a PDCCH reception where the UE detects the DCI format 2_4, where d is provided by a higher layer parameter. $T_{proc,2}$ corresponds to the PUSCH processing capability 2 [6, TS 38.214] assuming $d_{2,1}=0$ with $\mu$ being the smallest SCS configuration between the SCS configurations of the PDCCH and of a PUSCH transmission or of an SRS transmission on the serving cell. UE is not expected to cancel the transmission of SRS or PUSCH before the first symbol that is $T_{proc,2}$ after the end of the reception of the last symbol of the PDCCH carrying the ULCI including the effect of the timing advance.

For UE PUSCH preparation procedure time, according to TS 38.214, if the first uplink symbol in the PUSCH allocation for a transport block, including the DM-RS, as defined by the slot offset $K_2$ and the start and length indicator SLIV of the scheduling DCI and including the effect of the timing advance, is no earlier than at symbol $L_2$, where $L_2$ is defined as the next uplink symbol with its CP starting $T_{proc,2}=\max((N_2+d_{2,1})\ (2048+144)\cdot\kappa2^{-\mu}\cdot T_C,\ d_{2,2})$ after the end of the reception of the last symbol of the PDCCH carrying the DCI scheduling the PUSCH, then the UE shall transmit the transport block. $N_2$ is based on $\mu$ of Table 6.4-1 and Table 6.4-2 for UE processing capability 1 and 2 respectively, where $\mu$ corresponds to the one of $(\mu_{DL},\ \mu_{UL})$ resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and K is defined in clause 4.1 of [TS 38.211]. If the first symbol of the PUSCH allocation consists of DM-RS only, then $d_{2,1}=0$, otherwise $d_{2,1}=1$. If the UE is configured with multiple active component carriers, the first uplink symbol in the PUSCH allocation further includes the effect of timing difference between component carriers as given in [TS 38.133]. If the scheduling DCI triggered a switch of BWP, $d_{2,2}$ equals to the switching time as defined in [TS 38.133], otherwise $d_{2,2}=0$. For a UE that supports capability 2 on a given cell, the processing time according to UE processing capability 2 is applied if the high layer parameter processingType2Enabled in PUSCH-ServingCellConfig is configured for the cell and set to enable. If the PUSCH indicated by the DCI is overlapping with one or more PUCCH channels, then the transport block is multiplexed following the procedure in clause 9.2.5 of [TS 38.213], otherwise the transport block is transmitted on the PUSCH indicated by the DCI. Otherwise, the UE may ignore the scheduling DCI. The value of $T_{proc,2}$ is used both in the case of normal and extended cyclic prefix.

TABLE 6.4-1

| PUSCH preparation time for PUSCH timing capability 1 | |
| --- | --- |
| $\mu$ | PUSCH preparation time $N_2$ [symbols] |
| 0 | 10 |
| 1 | 12 |
| 2 | 23 |
| 3 | 36 |

TABLE 6.4-2

| PUSCH preparation time for PUSCH timing capability 2 | |
| --- | --- |
| $\mu$ | PUSCH preparation time $N_2$ [symbols] |
| 0 | 5 |
| 1 | 5.5 |
| 2 | 11 for frequency range 1 |

For resource allocation for uplink transmission with configured grant, according to 38.214, when PUSCH resource allocation is semi-statically configured by higher layer parameter configuredGrantConfig in BWP-UplinkDedicated information element, and the PUSCH transmission corresponding to a configured grant, the following higher layer parameters are applied in the transmission: For Type 1 PUSCH transmissions with a configured grant, the following parameters are given in configuredGrantConfig unless mentioned otherwise: For the determination of the PUSCH repetition type, if the higher layer parameter PUSCHRep-TypeIndicator-ForTypeIConfiguredgrant is configured and set to 'pusch-RepTypeB', PUSCH repetition type B is applied; otherwise, PUSCH repetition type A is applied. For PUSCH repetition type A, the selection of the time domain resource allocation table follows the rules for DCI format 0_0 on UE specific search space, as defined in Clause 6.1.2.1.1. For PUSCH repetition type B, the selection of the time domain resource allocation table is as follows: If PUSCHRepTypeIndicator-ForDCIFormat0_1 in pusch-Config is configured and set to 'pusch-RepTypeB', PUSCH-TimeDomainResourceAllocationList-ForDCIformat0_1 in pusch-Config is used. Otherwise, PUSCH-TimeDomainResourceAllocationList-ForDCIformat0_2 in pusch-Config is used. It is not expected that PUSCHRepTypeIndicator-ForTypeIConfiguredgrant is configured with 'pusch-RepTypeB' when none of PUSCHRepTypeIndicator-ForDCIFormat0_1 and PUSCHRepTypeIndicator-ForDCIFormat0_2 in pusch-Config is set to 'pusch-RepTypeB'.

The higher layer parameter timeDomainAllocation value m provides a row index m+1 pointing to the determined time domain resource allocation table, where the start symbol and length are determined following the procedure defined in Clause 6.1.2.1. Frequency domain resource allocation is determined by the N LSB bits in the higher layer parameter frequencyDomainAllocation, forming a bit sequence $f_{17},\ \ldots,\ f_1,\ f_0$, where $f_0$ is the LSB, according to the procedure in Clause 6.1.2.2 and Nis determined as the size of frequency domain resource assignment field in DCI format 0_1 for a given resource allocation type indicated by resourceAllocation, except if useInterlacePUSCH-Dedicated is set to 'enabled', in which case uplink type 2 resource allocation is used wherein the UE interprets the LSB bits in the higher layer parameter frequencyDomainAllocation as for the frequency domain resource assignment field of DCI 0_1 according to the procedure in Clause 6.1.2.2.3. The $I_{MCS}$ is provided by higher layer parameter mcsAndTBS. Number of DM-RS CDM groups, DM-RS ports, SRS resource indication and DM-RS sequence initialization are determined as in Clause 7.3.1.1 of [TS 38.212], and the antenna port value, the bit value for DM-RS sequence initialization, precoding information and number of layers, SRS resource indicator are provided by antennaPort, dmrs-SeqInitialization, precodingAndNumberOfLayers, and srs-ResourceIndicator respectively. When frequency hopping is enabled, the frequency offset between two frequency hops can be configured by higher layer parameter frequencyHoppingOffset.

For Type 2 PUSCH transmissions with a configured grant: the resource allocation follows the higher layer configuration according to [TS 38.321], and UL grant received on the DCI. The PUSCH repetition type and the time domain resource allocation table are determined by the PUSCH repetition type and the time domain resource allocation table associated with the UL grant received on the DCI, respectively, as defined in Clause 6.1.2.1.

For PUSCH transmissions with a Type 1 or Type 2 configured grant, the number of (nominal) repetitions K to be applied to the transmitted transport block is provided by the indexed row in the time domain resource allocation table if numberofrepetitions is present in the table. Otherwise, K is provided by the higher layer configured parameters repK.

The UE shall not transmit anything on the resources configured by configuredGrantConfig if the higher layers did not deliver a transport block to transmit on the resources allocated for uplink transmission without grant.

A set of allowed periodicities P are defined in [TS 38.331]. The higher layer parameter cg-nrofSlots-r16, provides the number of consecutive slots allocated within a configured grant period. The higher layer parameter cg-nrofPUSCH-InSlot-r16 provides the number of consecutive PUSCH allocations within a slot, where the first PUSCH allocation follows the higher layer parameter timeDomain-Allocation, and the remaining PUSCH allocations have the same length and PUSCH mapping type, and are appended following the previous allocations without any gaps. The same combination of start symbol and length and PUSCH mapping type repeats over the consecutively allocated slots.

For operation with shared spectrum channel access where a UE is performing uplink transmission with configured grants in contiguous OFDM symbols on all resource blocks of an RB set, for the first such UL transmission the UE randomly determines a duration of a cyclic prefix extension $T_{ext}$ to be applied for transmission according to [TS 38.211] from a set of values configured by higher layers according to the following rule: If the first such UL transmission is within a channel occupancy initiated by the gNB (defined in Clause 4 of [TS 37.213]), the set of values is determined by cg-StartingFullBW-InsideCOT-r16. Otherwise, the set of values is determined by cg-StartingFullBW-OutsideCOT-r16.

For operation with shared spectrum channel access where a UE is performing uplink transmission with configured grants in contiguous OFDM symbols on fewer than all resource blocks of an RB set, for the first such UL transmission the UE determines a duration of a cyclic prefix extension $T_{ext}$ to be applied for transmission according to [TS 38.211] according to the following rule: If the first such UL transmission is within a channel occupancy initiated by the gNB (defined in Clause 4 of [TS 37.213]), the $T_{ext}$ is equal to cg-StartingPartialBW-InsideCOT-r16. Otherwise, the $T_{ext}$ is equal to cg-StartingPartialBW-OutsideCOT-r16.

For transport block repetition for uplink transmissions of PUSCH repetition Type A with a configured grant The procedures described in this clause apply to PUSCH transmissions of PUSCH repetition Type A with a Type 1 or Type 2 configured grant. The higher layer parameter repK-RV defines the redundancy version pattern to be applied to the repetitions. If the parameter repK-RV is not provided in the configuredGrantConfig, the redundancy version for uplink transmissions with a configured grant shall be set to 0. Otherwise, for the nth transmission occasion among K repetitions, n=1, 2, . . . , K, it is associated with $(\text{mod}(n-1, 4)+1)^{th}$ value in the configured RV sequence. If a configured grant configuration is configured with Configuredgrantconfig-StartingfromRV0 set to 'off', the initial transmission of a transport block may only start at the first transmission occasion of the K repetitions. Otherwise, the initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, any of the transmission occasions of the K repetitions if the configured RV sequence is {0,0,0,0}, except the last transmission occasion when K≥8.

For any RV sequence, the repetitions shall be terminated after transmitting K repetitions, or at the last transmission occasion among the K repetitions within the period P, or from the starting symbol of the repetition that overlaps with a PUSCH with the same HARQ process scheduled by DCI format 0_0, 0_1 or 0_2, whichever is reached first. In addition, the UE shall terminate the repetition of a transport block in a PUSCH transmission if the UE receives a DCI format 0_1 with DFI flag provided and set to '1', and if in this DCI the UE detects ACK for the HARQ process corresponding to that transport block.

The UE is not expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE does not transmit the PUSCH in the transmission occasion.

For both Type 1 and Type 2 PUSCH transmissions with a configured grant, when K>1, the UE shall repeat the TB across the K consecutive slots applying the same symbol allocation in each slot, except if the UE is provided with higher layer parameters cg-nrofSlots-r16 and cg-nrof-PUSCH-InSlot-r16, in which case the UE repeats the TB in the repK earliest consecutive transmission occasion candidates within the same configuration. A Type 1 or Type 2 PUSCH transmission with a configured grant in a slot is omitted according to the conditions in Clause 11.1 of [TS38.213].

For transport block repetition for uplink transmissions of PUSCH repetition Type B with a configured grant The procedures described in this Clause apply to PUSCH transmissions of PUSCH repetition type B with a Type 1 or Type 2 configured grant. For PUSCH transmissions with a Type 1 or Type 2 configured grant, the nominal repetitions and the actual repetitions are determined according to the procedures for PUSCH repetition Type B defined in Clause 6.1.2.1. The higher layer configured parameters repK-RV defines the redundancy version pattern to be applied to the repetitions. If the parameter repK-RV is not provided in the configuredGrantConfig, the redundancy version for each actual repetition with a configured grant shall be set to 0. Otherwise, for the nth transmission occasion among all the actual repetitions (including the actual repetitions that are omitted) of the K nominal repetitions, it is associated with $(\text{mod}(n-1, 4)+1)^{th}$ value in the configured RV sequence. If a configured grant configuration is configured with Configuredgrantconfig-StartingfromRV0 set to 'off', the initial transmission of a transport block may only start at the first transmission occasion of the actual repetitions. Otherwise, the initial transmission of a transport block may start at the first transmission occasion of the actual repetitions if the configured RV sequence is {0,2,3,1}, any of the transmission occasions of the actual repetitions that are associated with RV=0 if the configured RV sequence is {0,3,0,3}, any of the transmission occasions of the actual repetitions if the configured RV sequence is {0,0,0,0}, except the actual repetitions within the last nominal repetition when K≥8.

For any RV sequence, the repetitions shall be terminated after transmitting K nominal repetitions, or at the last transmission occasion among the K nominal repetitions within the period P, or from the starting symbol of a repetition that overlaps with a PUSCH with the same HARQ process scheduled by DCI format 0_0, 0_1 or 0_2, whichever is reached first. The UE is not expected to be configured with the time duration for the transmission of K nominal repetitions larger than the time duration derived by the periodicity P.

Figure 2:
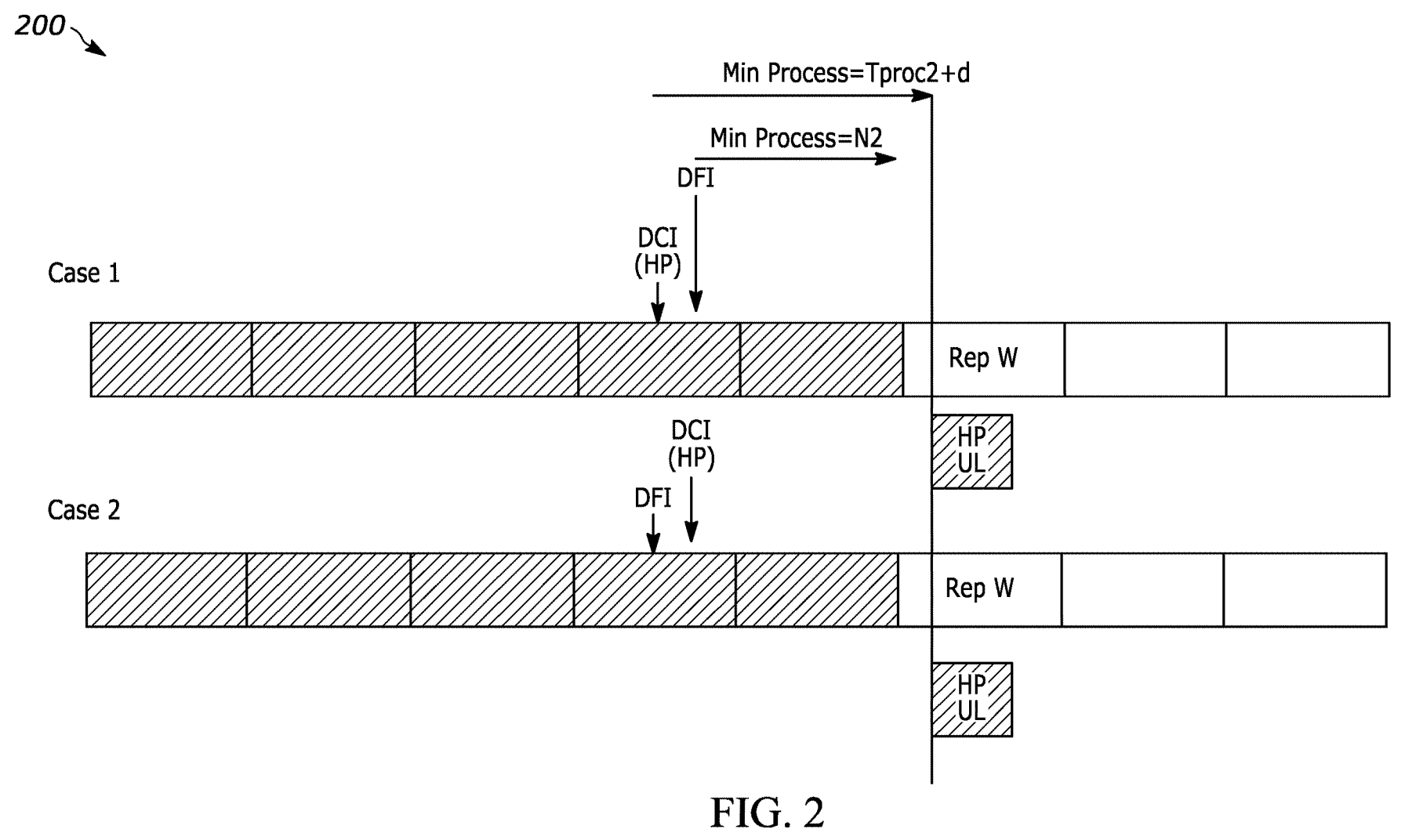

FIG. 2 is an example illustration 200 of two received cancellation indications for the low priority CG UL transmission according to possible embodiments. The following embodiments may incorporate the above embodiments. DFI indicates ACK for the low priority UL transmission and DCI (HP) schedules a high priority UL transmission overlapping with the low priority UL transmission. The length of each repetition can be configured by higher layer signalling, where the higher layer is higher than the physical layer.

In an example situation, the UE has received a DCI scheduling a high priority, (HP) UL transmission, where the high priority UL transmission overlaps with repetition Rep 'W' of a low priority (LP) configured grant UL transmission shown in the illustration 200, and has received a DCI comprising CG-DFI indicating a valid ACK for a transport block of a corresponding HARQ process number being transmitted in the low priority CG UL transmission. Repetition Rep 'W' can be a repetition of 'K' repetitions. At least some of the following embodiments can define a UE procedure/behaviour to cancel the low priority UL transmission. In some embodiments, the DCI scheduling a high priority UL transmission can be the DCI activating at least one configured grant type 2 transmission. In one example, the configured grant Type 2 PUSCH transmission can be semi-persistently scheduled by an UL grant in a valid activation DCI according to Clause 10.2 of TS 38.213 after the reception of higher layer parameter configuredGrantConfig not including rrc-ConfiguredUplinkGrant.

In a first embodiment, the UE cancels the low priority UL transmission according to the termination/cancellation timeline associated with the earlier received DCI, such as the DCI scheduling high priority UL transmission in case 1 and the DCI carrying DFI in case 2 of the illustration 200.

According to example, in case 1, the UE can cancel repetition Rep 'W' in the middle of the repetition (according to the timeline Tproc2+d) since the UE has received DCI (HP) scheduling the high priority transmission earlier than DFI and may have already started cancellation procedure due to DCI (HP). The UE can cancel the PUSCH repetition Rep 'W' transmission corresponding to the configured grant that is partially or fully overlapping in time with the HP PUSCH/UL transmission scheduled by a PDCCH at latest starting M symbols (e.g., $M=T_{proc,2}+d_1$) after the end of the last symbol of the PDCCH carrying the DCI scheduling the HP PUSCH/UL transmission. Also, all repetitions after Rep 'W' can be cancelled due to reception of DFI with a valid ACK for a transport block of a corresponding HARQ process associated with the LP configured grant PUSCH transmission.

In case 2, the UE can cancel repetition Rep 'W' from the beginning of the repetition and all other repetitions after repetition Rep 'W' since the UE has received DFI sooner than DCI (HP). The UE can be expected to terminate the Rep 'W' repetition of the transport block in the LP configured grant PUSCH transmission starting from a symbol j if the gap between the end of CG-DFI PDCCH of symbol i and the start of the PUSCH transmission in symbol j is equal to or more than N2 symbols (in one example, 'N2' is defined in clause 6.4 of TS 38.214).

In a second embodiment, the UE cancels the low priority UL transmission according to the earliest time possible for cancellation, e.g., termination/cancellation timeline associated with any DCI among the two received DCI that results in the earliest termination/cancellation of the LP configured grant PUSCH transmission.

According to an example of the illustration 200, for both case 1 and case 2, the UE can cancel repetition Rep 'W' from the beginning of the repetition and all other repetitions after Rep 'W' since the earliest time for cancellation is the start of repetition Rep 'W'.

In a third embodiment, the cancellation timeline/requirement corresponding to CG-DFI reception is updated from 'N2' symbols to '$T_{proc,2}+d1$' (or the same as the cancellation timeline/requirement for reception of DCI scheduling high priority UL transmission). According to an example of the illustration 200, the UE can cancel the low priority UL transmission according to the earliest received DCI (DFI or DCI (HP)). In an example, the cancellation timeline/requirement corresponding to DFI reception can be updated from 'N2' symbols to '$T_{proc,2}+d1$' (or the same as the cancellation timeline/requirement for reception of DCI scheduling high priority UL transmission) when the UE expects to receive a DCI scheduling high priority UL transmission, such as when the UE is configured to monitor a DCI format that can schedule high priority UL transmissions (e.g., via using a priority index Priority indicator field configured in the DCI format, or a higher layer parameter priority configured for configured grant PUSCH transmission).

In a fourth embodiment, the DCI scheduling the high priority UL transmission (e.g., DCI with a field indicating high priority for the scheduled UL transmission), can also indicate DFI for the low priority UL transmission that overlaps with the scheduled high priority transmission. Such embodiment could be useful in case the UE misses the standalone DFI (CG-DFI). Presence of a field indicating DFI in DCI (HP) can be configured. In one example, if the UE is configured to monitor a DCI format that can indicate priority of an UL transmission, a field associated with that DCI format can be configured to indicate DFI for a low priority UL transmission. In one example, if the UE is configured to monitor a DCI format that can indicate priority of an UL transmission, a field associated with that DCI format can be configured to indicate DFI/acknowledgment for the most recent low priority UL (e.g., configured grant PUSCH) transmission. In one example, if the UE is configured to monitor a DCI format that can indicate priority of an UL transmission, a field associated with that DCI format can be configured to indicate DFI/acknowledgment for the most recent high priority UL transmission (e.g., configured grant PUSCH). In one example, if the UE is configured to monitor a DCI format that can indicate priority of an UL transmission, a field associated with that DCI format can be configured to indicate DFI/acknowledgment for an UL transmission (e.g., the most recent configured grant PUSCH) having the same priority as the indicated priority. In one example, a UE can be configured to monitor a DCI format that can indicate DFI/acknowledgment for an UL transmission (e.g., the most recent configured grant PUSCH) of high priority.

In one example, DFI field in the DCI format (HP) can be set to ACK only for a low priority UL transmission overlapping the scheduled HP UL transmission (ACK is not applicable to other non-overlapping LP UL transmissions). For instance, the LP UL repetition overlapping with the HP transmission can be cancelled. However, the rest of UL repetitions that do not overlap with the HP UL transmission may not be cancelled if not ACK'ed. Also, receiving an ACK can eliminate the need of any autonomous re-transmission. In one example, the HP UL transmission can be a PUCCH transmission corresponding to a HARQ codebook with high priority.

In one example, in the illustration 200, for case 1, if the DCI (HP) indicates ACK for the low priority transmission, repetition Rep 'W' can be cancelled from the beginning of the repetition W (e.g., if 'N2' is considered as the timeline for termination of the low priority transmission due to DFI reception).

In one example, if a configured grant UL transmission of a UE (e.g., repetition Rep 'W') overlaps with a PUCCH transmission (e.g., of lower priority); PUCCH can be dropped and the UCI on PUCCH can be transmitted/piggybacked on repetition Rep 'W'. If the UE has a configured grant UL transmission overlapping with a PUCCH transmission (e.g., PUCCH overlaps with repetition Rep 'W' of the configured grant); and if the UE has received a DFI with a valid ACK for the TB corresponding to a HARQ process associated with the configured grant UL transmission, at least a certain number of symbols (e.g., 'N2' symbols) before repetition Rep 'W', one of the following embodiments/mechanisms can be applicable. According to a first embodiment, the PUCCH can be cancelled and repetitions starting from repetition Rep 'W' can be terminated. According to a second embodiment, the PUCCH may not be cancelled and repetitions starting from repetition Rep 'W' can be terminated. According to a third embodiment, the PUCCH may not be cancelled, if DFI with valid ACK is received certain time before repetition Rep 'W' (e.g., N2+delta, where delta can be a UE capability); and repetitions starting from repetition Rep 'W' can be terminated. According to a fourth embodiment, if a HP UL transmission also overlaps with repetition Rep 'W', PUCCH can be cancelled and UCI of PUCCH can be multiplexed on the HP UL transmission if a UCI multiplexing timeline is satisfied; and repetitions starting from repetition Rep 'W' can be terminated.

In one embodiment, the UE can cancel the low priority UL transmission according to the earliest cancellation time that is not earlier than the cancellation time determined in response to receiving a high priority UL grant.

In some examples, the embodiments described above can also be applicable for case of a high priority PUCCH UL transmission instead of a DCI scheduling a high priority (HP) UL transmission. The PUCCH UL transmission can be scheduled via a DCI scheduling the associated DL transmission. The PUCCH can be transmitted by the UE in response to the scheduled DL transmission.

The embodiments above can also be applicable for the case that the UE has received an UL CI instead of DCI (HP). UL CI can be a DCI indicating a set of resources and UE can cancel an UL transmission if it overlaps with the set of resources in time-frequency domain.

The UE can be configured to be able to start an initial transmission of a TB only from a first transmission occasion of the 'K' repetitions ('K' can be configured or indicated in activation DCI in configured grant type 2) [e.g., when the higher layer parameter ConfiguredgrantconfigStartingfromRV0 set to 'off']. Alternately, UE can be configured to be able to start an initial transmission of a TB from some of the transmission occasions of the 'K' repetitions corresponding to RV0 according to rules defined in section 6.1.2.3.1 of TS 38.214.

In an embodiment, if the UE cancels/drops transmission of a low priority PUSCH in the first transmission occasion of the 'K' repetitions, e.g. due to reception of an UL grant scheduling high priority UL transmission or an UL CI indicating resources for cancellation, where the resources overlap with the first transmission occasion of the 'K' repetition; and if the UE is configured to start an initial transmission of a TB only from a first transmission occasion of the 'K' repetitions e.g., when the higher layer parameter ConfiguredgrantconfigStartingfromRV0 set to 'off'; one of the following UE behaviors/procedures can be used. According to a first behavior, the UE does not transmit the TB in any of the transmission occasions of the 'K' repetitions. Alternately, according to a second behavior, the UE can transmit the TB in a transmission occasion (e.g., the next TO (transmission occasion) of the 'K' repetitions having an RV0 that is not cancelled e.g., due to overlap with high priority UL transmission or UL CI indication) of the 'K' repetitions of the TB associated with RV0. The UE can be configured by RRC between the two behaviors. Also, the UE can be indicated in the UL grant scheduling high priority data on whether to use the first or second behavior. A repetition associated with RV0 can be potentially decoded without need for any other repetition, whereas repetitions associated with other RVs may need a second repetition to be decodable.

In a related embodiment, the next TO of the 'K' repetitions that is not cancelled e.g., due to overlap with high priority UL transmission or UL CI indication, can be assigned RV 0 (or in an example, set to RV 0 by the UE), and the RV associated with the rest of the TOs can be derived based on the TO with assigned/set RV 0 (e.g., additionally based on a configured RV sequence—e.g., for the nth transmission occasion among K repetitions starting for the TO with assigned/set RV 0, n=1, 2, . . . , K, it is associated with $(\mod(n-1,4)+1)^{th}$ value in the configured RV sequence).

In a related embodiment, the UE may not be expected to be configured (a) with ConfiguredgrantconfigStartingfromRV0 set to 'off' and (b) to monitor a DCI that can schedule high priority UL transmission/a DCI that can indicate UL cancellation.

According to TS 38.214, the higher layer parameter cg-nrofPUSCH-InSlot-r16 provides the number of consecutive PUSCH allocations within a slot, where the first PUSCH allocation follows the higher layer parameter timeDomainAllocation, and the remaining PUSCH allocations have the same length and PUSCH mapping type, and are appended following the previous allocations without any gaps. The same combination of start symbol and length and PUSCH mapping type repeats over the consecutively allocated slots.

In a related embodiment, if multiple TBs can be transmitted in a configured grant (e.g., $1^{st}$ TB with 'K' repetitions in a first set of TOs of a first PUSCH allocation, and $2^{nd}$ TB with 'K' repetitions in a second set of TOs of a second PUSCH allocation of the consecutive PUSCH allocations); and if the UE is configured to start an initial transmission of a TB only from a first transmission occasion of the 'K' repetitions (e.g., ConfiguredgrantconfigStartingfromRV0 set to 'off'); the UE can start an initial transmission of a TB only from a first transmission occasion of the 'K' repetitions of each PUSCH allocation of the consecutive PUSCH allocations.

At least some embodiments can provide mechanisms to determine the cancellation timeline when the UE has received a DFI indicating an ACK for the low-priority configured grant UL transmission with multiple repetitions; and received a PDCCH scheduling a high-priority UL transmission overlapping with at least one repetition of the low-priority configured grant UL transmission or an UL cancellation indication indicating resources overlapping with at least one repetition of the low-priority configured grant UL transmission.

According to a possible embodiment, a method can be performed at a device. The method can include receiving a configured grant configuration comprising resources for uplink data transmissions. The method can include preparing a PUSCH (UL data) transmission corresponding to the configured grant; wherein a TB associated to a HARQ process is prepared to be repeated 'K' times in a first set of resources associated to the PUSCH. The method can include receiving a first DCI. The first DCI can indicate an ACK for the HARQ process corresponding to the TB. The method can include receiving a second DCI indicating a second set of resources. The first set of resources and the second set of resources can overlap in the time domain. The method can include determining a first cancellation/termination/dropping time associated to the prepared PUSCH based on the reception of the first DCI. The method can include determining a second cancellation/termination/dropping time associated to the prepared PUSCH based on the reception of the second DCI. The method can include determining a third cancellation/termination/dropping time associated to the prepared PUSCH based on the determined first cancellation/termination/dropping time and determined second cancellation/termination/dropping time. The method can include cancelling/terminating/dropping the prepared PUSCH according to the third cancellation/termination/dropping time.

The prepared PUSCH can be associated with low priority and the second DCI can schedule an UL transmission associated with high priority. The device can cancel/terminate the low priority PUSCH according to the earliest cancellation/termination time that is not earlier than the cancellation/termination time determined in response to receiving the second DCI. The second DCI can indicate the ACK for the HARQ process corresponding to the TB of the low priority prepared PUSCH. The second DCI can be associated with a DCI format corresponding to UL cancellation indication. The third cancellation/termination/dropping time can be the first cancellation/termination/dropping time when the first DCI is received before or not later than the second DCI. The third cancellation/termination/dropping time can be the second cancellation/termination/dropping time when the second DCI is received before or not later than the first DCI. The third cancellation/termination/dropping time can be the smaller/shorter/sooner of the first cancellation/termination/dropping time and the second cancellation/termination/dropping time. The device can cancel/terminate the prepared PUSCH according to the earliest time resulting in cancellation/termination of the prepared PUSCH.

FIG. 3 is an example flowchart 300 illustrating the operation of a wireless communication device, such as the UE 110, according to a possible embodiment. At 310, a configured grant configuration comprising resources for uplink data transmissions can be received. The first set of resources can be from the resources for uplink data transmission in the configured grant configuration. At 320, a PUSCH transmission corresponding to the configured grant configuration can be prepared. The PUSCH transmission can be for uplink data. A TB of the PUSCH transmission can correspond to a HARQ process. The TB can be prepared to be repeated a number, 'K', of times in a first set of resources configured for the PUSCH transmission.

At 330, a first DCI can be received. The first DCI can indicate an ACK for the HARQ process corresponding to the TB. The first DCI indicating the ACK can be DFI. At 340, a second DCI can be received. The second DCI can indicate a second set of resources. The first set of resources and the second set of resources can overlap in the time domain. The second DCI can be received before or after the first DCI. The PUSCH transmission can be a low priority PUSCH transmission and the second DCI can schedule a high priority UL transmission. There could be a priority index in the scheduling DCI scheduling a PUSCH transmission or a configuration parameter indicating a priority index for a configured grant PUSCH transmission.

At 350, a cancellation time associated with the PUSCH transmission can be determined based on both the received first DCI and the received second DCI. The determined cancellation time can be an absolute cancellation time or can be a time period until cancellation of the PUSCH transmission. At 360, the PUSCH transmission can be cancelled according to the cancellation time. Cancelling the PUSCH transmission can include cancelling the PUSCH transmission after it has already started. For example, at least one repetition of the PUSCH transmission can be transmitted and the remaining repetitions can be cancelled.

According to a possible embodiment, the determined cancellation time can be based on an earliest cancellation time that is not earlier than a cancellation time determined in response to receiving the second DCI. According to a possible embodiment, the second DCI can indicate the ACK for the HARQ process corresponding to the TB of the PUSCH transmission. According to a possible embodiment, the PUSCH transmission can include UCI. The UCI can be transmitted in the second set of resources.

According to a possible embodiment, the second DCI can have a DCI format that indicates UL cancellation. The indicated UL cancellation can be applicable to at least one repetition of the TB. According to a possible embodiment, determining the cancellation time can include determining the cancellation time associated with the PUSCH transmission as a cancellation time based on the earliest received DCI of the first DCI and the second DCI.

According to a possible embodiment, the first DCI can have a first associated cancellation time and the second DCI has a second associated cancellation time. Determining the cancellation time can include determining the cancellation time to be the first associated cancellation time when the first DCI is received before or not later than the second DCI and can include determining the cancellation time to be the second associated cancellation time when the second DCI is received before or not later than the first DCI. According to a possible implementation, determining the cancellation time can include determining the cancellation time to be an earliest cancellation time resulting from the first associated cancellation time and the second associated cancellation time when the first DCI is received at the same time as the second DCI.

According to a possible embodiment, the cancellation time can be a third cancellation time. A first cancellation time associated with the PUSCH transmission can be determined based on the reception of the first DCI. A second cancellation time associated with the PUSCH transmission can be determined based on the reception of the second DCI. The third cancellation time can be an earliest cancellation time resulting from the first cancellation time and the second cancellation time. Also, a time from the reception of the first DCI to the first cancellation time can be the same as the time from the reception of the second DCI to the second cancellation time.

According to a possible embodiment, the cancellation time comprises a third cancellation time. A first cancellation time associated with the prepared PUSCH can be determined based on the reception of the first DCI. A second cancellation time associated with the PUSCH transmission can be determined based on the reception of the second DCI. The third cancellation time can be determined based on the third cancellation time not being earlier than the second cancellation time.

According to a possible embodiment, the first DCI can be received not earlier than a certain time prior to the end of a repetition of the PUSCH transmission, wherein the certain time is provided by the configured grant configuration. For example, CG-minDFI-delay, a RRC parameter, can indicate an earliest time the DFI can be sent/received with respect of the end of any repetition of a PUSCH transmission.

According to a possible embodiment, determining the cancellation time can include determining a cancellation time of a repetition of the PUSCH transmission based on both the received first DCI and the received second DCI. Cancelling the PUSCH repetition can include cancelling the repetition of the PUSCH transmission according to the cancellation time. One or all of the repetitions of the PUSCH transmission can be cancelled.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, mobility management entity, or other network entity, can perform reciprocal operations of a UE. For example, the network entity can transmit signals received by the UE and can receive signals transmitted by the UE. The network entity can also process and operate on sent and received signals.

Figure 4:
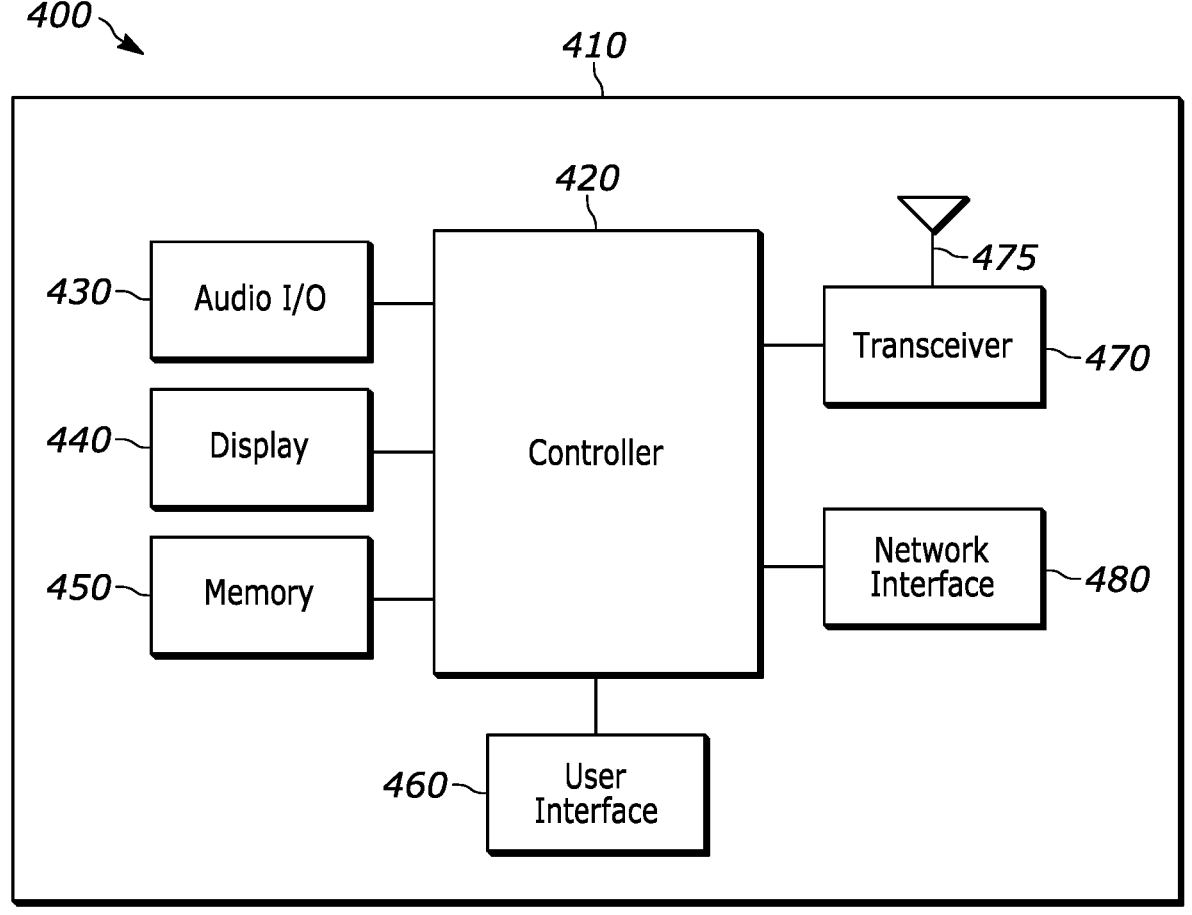
FIG. 4 is an example block diagram of an apparatus according to a possible embodiment.

FIG. 4 is an example block diagram of an apparatus 400, such as the UE 110, the network entity 120, or any other wireless communication device disclosed herein, according to a possible embodiment. The apparatus 400 can include a housing 410, a controller 420 coupled to the housing 410, audio input and output circuitry 430 coupled to the controller 420, a display 440 coupled to the controller 420, a memory 450 coupled to the controller 420, a user interface 460 coupled to the controller 420, a transceiver 470 coupled to the controller 420, at least one antenna port 475, such as at least one antenna, coupled to the transceiver 470, and a network interface 480 coupled to the controller 420. The apparatus 400 may not necessarily include all of the illustrated elements for different embodiments of the present disclosure. The apparatus 400 can perform the methods described in all the embodiments.

The display 440 can be a viewfinder, an LCD, an LED display, an OLED display, a plasma display, a projection display, a touch screen, or any other device that displays information. The transceiver 470 can be one or more transceivers that can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a USB port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 450 can include a RAM, a ROM, an EPROM, an optical memory, a solid-state memory, a flash memory, a removable memory, a hard drive, a cache, or any other memory that can be coupled to an apparatus.

The apparatus 400 or the controller 420 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 450, elsewhere on the apparatus 400, in cloud storage, and/or anywhere else that can store software and/or an operating system. For example, coding for operations can be implemented as firmware programmed into ROM. The apparatus 400 or the controller 420 may also use hardware to implement disclosed operations. For example, the controller 420 may be any programmable processor. Furthermore, the controller 420 may perform some or all of the disclosed operations. For example, at least some operations can be performed using cloud computing and the controller 420 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

In operation, the apparatus 400 can perform the methods and operations of the disclosed embodiments. The transceiver 470 can transmit and receive signals, including data signals and control signals that can include respective data and control information. The controller 420 can generate and process the transmitted and received signals and information.

According to a possible embodiment, the transceiver 470 can receive a configured grant configuration comprising resources for uplink data transmissions. The controller 420 can prepare a PUSCH transmission corresponding to the configured grant configuration. A TB of the PUSCH transmission can correspond to a HARQ process and can be prepared to be repeated a number, 'K', of times in a first set of resources configured for the PUSCH transmission. The transceiver 470 can receive a first DCI. The first DCI can indicate an ACK for the HARQ process corresponding to the TB. The transceiver 470 can receive a second DCI indicating a second set of resources. The first set of resources and the second set of resources can overlap in the time domain. The controller 420 can determine a cancellation time associated with the PUSCH transmission based on both the received first DCI and the received second DCI. The controller 420 can cancel the PUSCH transmission according to the cancellation time.

According to a possible embodiment, the PUSCH transmission can be a low priority PUSCH transmission and the second DCI can schedule a high priority UL transmission. According to a possible embodiment, the determined cancellation time can be based on an earliest cancellation time that is not earlier than a cancellation time determined in response to receiving the second DCI. According to a possible embodiment, the second DCI can indicate the ACK for the HARQ process corresponding to the TB of the PUSCH transmission. According to a possible embodiment, determining the cancellation time can include determining the cancellation time associated with the PUSCH transmission as a cancellation time based on an earliest received DCI of the first DCI and the second DCI.

According to a possible embodiment, the first DCI can have a first associated cancellation time and the second DCI can have a second associated cancellation time. Determining the cancellation time can include determining the cancellation time to be the first associated cancellation time when the first DCI is received before or not later than the second DCI, and can include determining the cancellation time to be the second associated cancellation time when the second DCI is received before or not later than the first DCI.

According to a possible embodiment, the cancellation time can be a third cancellation time. The controller 420 can determine a first cancellation time associated with the PUSCH transmission based on the reception of the first DCI. The controller 420 can determine a second cancellation time associated with the PUSCH transmission based on the reception of the second DCI. The third cancellation time can be an earliest cancellation time resulting from the first cancellation time and the second cancellation time.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

List of Abbreviations

3GPP 3rd Generation Partnership Project
5G Fifth Generation
ACK Acknowledgement
A-CSI Aperiodic CSI
BWP Bandwidth Part
CA Carrier Aggregation
CC Component Carrier
CCCH SDU Common Control Channel Service Data Unit
CCE Control Channel Element
CDMA Code Division Multiple Access
CG Configured grant
CG-DFI CG downlink feedback information
CI Cancellation Indication
CORESET Control Resource Set
CRC Cyclic Redundancy Check
CRI CSI-RS Resource Index
C-RNTI Cell RNTI
CSI-RS Channel State Information Reference Signal
CSI Channel State Information
CSS Common Search Space
DCI Downlink Control Information
DFI Downlink Feedback Indication
DL Downlink
DMRS Demodulation Reference Signal
eNB Enhanced NodeB
FBE Frame Based Equipment
FFP Fixed Frame Period
FDD Frequency Division Duplex
gNB New Radio NodeB
HARQ Hybrid Automatic Repeat Request
HST High Speed Train
IoT Internet of Things
LTE Long Term Evolution
MAC CE Medium Access Control Control Element
MCG Master Cell Group
MCS Modulation and Coding Scheme
MPE Maximum Permissible Exposure
NACK Non-Acknowledgement
NUL Non-supplementary Uplink
NR New Radio
NRU New Radio Unlicensed
OFDMA Orthogonal Frequency Division Multiple Access
PCell Primary Cell
PDCCH Physical Downlink Control Channel
PDSCH Physical Downlink Shared Channel
PDU Protocol Data Unit
PHR Power Headroom Report
P-MPR Power Management Maximum Power Reduction
PRACH Physical Random Access Channel
PUCCH Physical Uplink Control Channel
PUSCH Physical Uplink Shared Channel
QCL Quasi-co-location
RAR Random Access Response
RLF Radio Link Failure
RNTI Radio Network Temporary Identifier
RRM Radio Resource Management
RS Reference Signal
RSRP Reference Signal Received Power RUR Reference Uplink Region
RV Redundancy Version
SAR Specific Absorption Rate
SCell Secondary Cell
SCG Secondary Cell Group
SCS Subcarrier Spacing
SFI Slot Format Indicator
SFN Single Frequency Network
SpCell Special Cell (i.e. a PCell of a MCG or SCG)
SS Search space
SS/PBCH Synchronization Signal/Physical Broadcast Channel
SSBRI SS/PBCH Block Resource Index
SR Scheduling Request
SP-CSI Semi-persistent CSI
SPS Semi-persistent scheduling
SRS Sounding Reference Signal
SRI SRS Resource Indicator
SUL Supplementary Uplink
TA Timing Advance
TB Transport block
TCI Transmission Configuration Indicator
TC-RNTI Temporary Cell RNTI
TDD Time Division Duplex
TDMA Time Division Multiple Access
TO Transmission Occasion
TS Technical Specification
UCI Uplink Control Information
UE User Equipment
UL Uplink
ULCI Uplink Cancellation Indication
URLLC Ultra-Reliable Low-Latency Communication
TRP Transmission and Reception Point
USS UE-specific Search Space

We claim:

1. A method performed by a user equipment (UE), the method comprising:
    receiving a configured grant configuration comprising resources for uplink data transmissions;
    preparing a physical uplink shared channel (PUSCH) transmission corresponding to the configured grant configuration, wherein a transport block of the PUSCH transmission corresponds to a hybrid automatic repeat request (HARQ) process and is to be repeated a number of times in a first set of resources configured for the PUSCH transmission;
    receiving a first downlink control information (DCI) indicating an acknowledgement for the HARQ process corresponding to the transport block;
    receiving a second DCI indicating a second set of resources, wherein the second set of resources and the first set of resources overlap in a time domain;
    determining a single cancellation time associated with the PUSCH transmission using both the first DCI and the second DCI; and
    cancelling the PUSCH transmission according to the single cancellation time.

2. The method of claim 1, wherein the PUSCH transmission is a low priority PUSCH transmission and the second DCI schedules a high priority uplink transmission.

3. The method of claim 2, wherein the single cancellation time is based at least in part on an earliest cancellation time that is not earlier than a second cancellation time determined in response to receiving the second DCI.

4. The method of claim 1, wherein the second DCI indicates the acknowledgement for the HARQ process corresponding to the transport block.

5. The method of claim 1, wherein the second DCI has a DCI format indicating uplink cancellation, wherein the uplink cancellation is applicable to at least one repetition of the transport block.

6. The method of claim 1, wherein determining the single cancellation time comprises determining the single cancellation time according to an earliest received DCI of the first DCI and the second DCI.

7. The method of claim 1, wherein the first DCI is associated with a first cancellation time and the second DCI is associated with a second cancellation time, and wherein determining the single cancellation time comprises:
    determining the single cancellation time to be the first cancellation time when the first DCI is received before or not later than the second DCI, and
    determining the single cancellation time to be the second cancellation time when the second DCI is received before or not later than the first DCI.

8. The method of claim 7, wherein determining the single cancellation time comprises determining the single cancellation time to be an earliest cancellation time of the first cancellation time and the second cancellation time when the first DCI is received at a same time as the second DCI.

9. The method of claim 1, wherein the single cancellation time comprises a third cancellation time, the method further comprising:
    determining a first cancellation time associated with the PUSCH transmission based at least in part on reception of the first DCI; and
    determining a second cancellation time associated with the PUSCH transmission based at least in part on reception of the second DCI,
    wherein the third cancellation time is an earliest cancellation time of the first cancellation time and the second cancellation time.

10. The method of claim 1, wherein the PUSCH transmission includes uplink control information, the method further comprising transmitting the uplink control information in the second set of resources.

11. The method of claim 1, wherein the single cancellation time comprises a third cancellation time, and wherein the method further comprises:
    determining a first cancellation time associated with the PUSCH transmission based at least in part on reception of the first DCI; and
    determining a second cancellation time associated with the PUSCH transmission based at least in part on reception of the second DCI,
    wherein the third cancellation time is determined based at least in part on the third cancellation time not being earlier than the second cancellation time.

12. The method of claim 1, wherein the first DCI is received not earlier than a time duration prior to an end of a repetition of the PUSCH transmission, wherein the time duration is indicated by the configured grant configuration.

13. The method of claim 1, wherein the single cancellation time is associated with a repetition of the PUSCH transmission, and wherein cancelling the PUSCH transmission comprises cancelling the repetition of the PUSCH transmission according to the single cancellation time.

14. A user equipment (UE) for wireless communication, comprising:
    at least one memory; and
    at least one processor coupled to the at least one memory and operable to cause the UE to:
        receive a configured grant configuration comprising resources for uplink data transmissions;

prepare a physical uplink shared channel (PUSCH) transmission corresponding to the configured grant configuration, wherein a transport block of the PUSCH transmission corresponds to a hybrid automatic repeat request (HARQ) process and is to be repeated a number of times in a first set of resources configured for the PUSCH transmission;

receive a first downlink control information (DCI) indicating an acknowledgement for the HARQ process corresponding to the transport block;

receive a second DCI indicating a second set of resources, wherein the second set of resources and the first set of resources overlap in a time domain;

determine a single cancellation time associated with the PUSCH transmission using both the first DCI and the second DCI; and cancel the PUSCH transmission according to the single cancellation time.

15. The UE of claim 14, wherein the PUSCH transmission is a low priority PUSCH transmission and the second DCI schedules a high priority uplink transmission.

16. The UE of claim 14, wherein the second DCI indicates the acknowledgement for the HARQ process corresponding to the transport block.

17. The UE of claim 14, wherein, to determine the single cancellation time, the at least one processor is further operable to cause the UE to determine the single cancellation time according to an earliest received DCI of the first DCI and the second DCI.

18. The UE of claim 14, wherein the first DCI is associated with a first cancellation time and the second DCI is associated with a second cancellation time, and wherein, to determine the single cancellation time, the at least one processor is further operable to cause the UE to:

determine the single cancellation time to be the first cancellation time when the first DCI is received before or not later than the second DCI; and determine the single cancellation time to be the second cancellation time when the second DCI is received before or not later than the first DCI.

19. The UE of claim 14, wherein the single cancellation time comprises a third cancellation time, and wherein, to determine the single cancellation time, the at least one processor is further operable to cause the UE to:

determine a first cancellation time associated with the PUSCH transmission based at least in part on reception of the first DCI; and determine a second cancellation time associated with the PUSCH transmission based at least in part on reception of the second DCI, wherein the third cancellation time is an earliest cancellation time of the first cancellation time and the second cancellation time.

20. A processor for wireless communication, comprising:

at least one controller coupled with at least one memory and operable to cause the processor to:

receive a configured grant configuration comprising resources for uplink data transmissions;

prepare a physical uplink shared channel (PUSCH) transmission corresponding to the configured grant configuration, wherein a transport block of the PUSCH transmission corresponds to a hybrid automatic repeat request (HARQ) process and is to be repeated a number of times in a first set of resources configured for the PUSCH transmission;

receive a first downlink control information (DCI) indicating an acknowledgement for the HARQ process corresponding to the transport block;

receive a second DCI indicating a second set of resources, wherein the second set of resources and the first set of resources overlap in a time domain;

determine a single cancellation time associated with the PUSCH transmission using both the first DCI and the second DCI; and cancel the PUSCH transmission according to the single cancellation time.

* * * * *